US006665813B1

United States Patent
Forsman et al.

(10) Patent No.: US 6,665,813 B1
(45) Date of Patent: Dec. 16, 2003

(54) METHOD AND APPARATUS FOR UPDATEABLE FLASH MEMORY DESIGN AND RECOVERY WITH MINIMAL REDUNDANCY

(75) Inventors: Stephanie Maria Forsman, Rochester, MN (US); Shawn Michael Lambeth, Pine Island, MN (US); Chetan Mehta, Austin, TX (US); Paul Edward Movall, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 578 days.

(21) Appl. No.: 09/631,719

(22) Filed: Aug. 3, 2000

(51) Int. Cl.$^7$ ................................................ H02H 3/05
(52) U.S. Cl. ............................................ 714/15; 714/5
(58) Field of Search .......................... 714/15, 5, 6, 7, 714/8, 16, 20, 42, 718; 713/200, 202; 711/102, 104, 164

(56) References Cited

U.S. PATENT DOCUMENTS

| 5,889,987 | A | * | 3/1999 | Nelson et al. | 713/2 |
| 6,026,016 | A | * | 2/2000 | Gafken | 365/185.04 |
| 6,092,190 | A | * | 7/2000 | Lee | 713/2 |
| 6,308,265 | B1 | * | 10/2001 | Miller | 713/2 |
| 6,536,038 | B1 | * | 3/2003 | Ewertz et al. | 717/168 |

* cited by examiner

Primary Examiner—Dieu-Minh Le
(74) Attorney, Agent, or Firm—Duke W. Yee; Mark E. McBurney; Lisa L.B. Yociss

(57) ABSTRACT

A method and an apparatus is presented for updating flash memory that contains a write protected code, a first copy of rewritable recovery code, a second copy of rewritable recovery code, and a rewritable composite code. Each block of rewritable code contains a checksum code to detect if the block of code has been corrupted. If it is detected that the first copy of the recovery code is corrupted then the second copy of the recovery code is copied into the first copy of the recovery code. If it is detected the second copy of the recovery code is corrupted then the first copy of the recovery code is copied into the second copy of the recovery code. The recovery code is responsible for checking and updating the composite code. If it is detected the composite code is corrupted then a fresh copy of the composite code is obtained from a removable storage device or a network connection. The data processing system is booted by executing the write protected code, the first copy of the recovery code, and the composite code. There is a minimum of redundant code by only replicating two copies of the recovery code while, at the same time, guaranteeing both the integrity and the updateability of the flash memory.

27 Claims, 3 Drawing Sheets

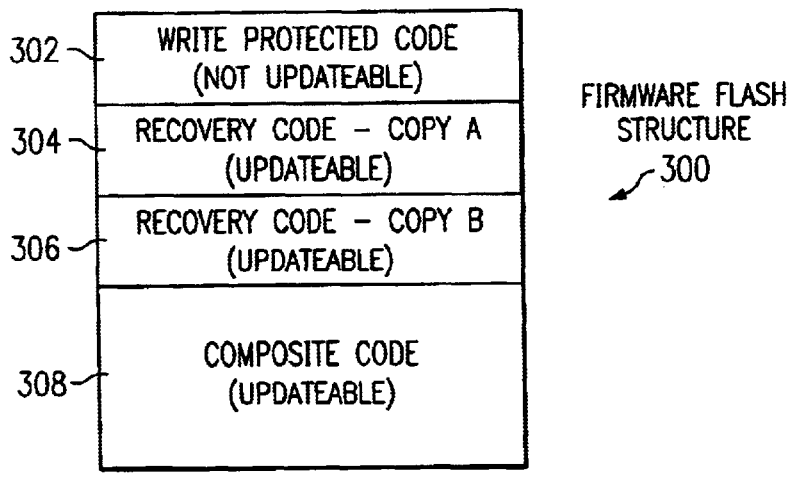
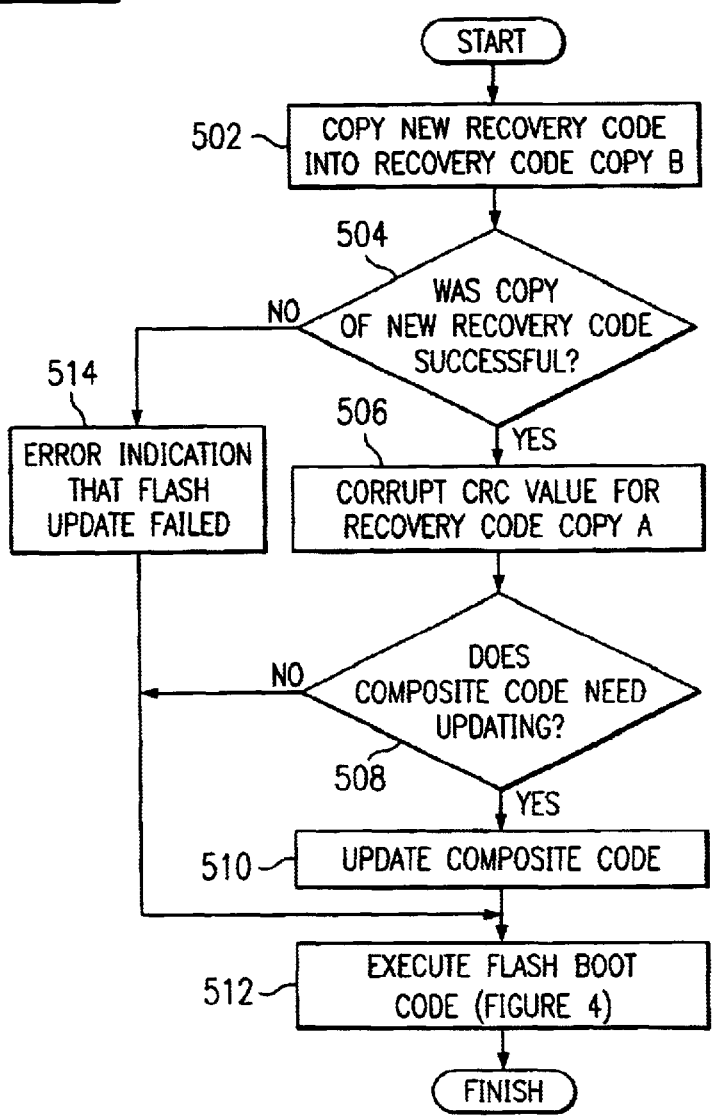

METHOD AND APPARATUS FOR UPDATEABLE FLASH MEMORY DESIGN AND RECOVERY WITH MINIMAL REDUNDANCY

BACKGROUND OF THE INVENTION

1. Technical Field

The present invention relates generally to an improved flash memory design and in particular to a method and an apparatus for recovery using a flash memory system. Still more particularly, the present invention provides a method and an apparatus for fail-safe flash memory recovery with minimal redundancy.

2. Description of the Related Art

When a modern computer system is started, it executes firmware to initialize and test the system before control is transferred to an operating system. This firmware is typically stored in "flash" memory. Since a system configuration can change over a period of time, this flash memory is updateable so that it finds and initializes the devices currently installed on the system.

If a major system error, such as a power failure, occurs during the update process, the flash memory can be corrupted. Therefore, it is important that there be a mechanism to recover the contents of the flash memory firmware in the event of corruption during update, without requiring a hardware update of the corrupted parts.

A simple, but wasteful, solution is to maintain two complete separate copies of the firmware in flash memory along with minimal code to verify each copy prior to its use. If the verification code detects a corrupted Copy "A" due to a major problem, such as a power failure, it can now use Copy "B" to startup the system. Corruption can be detected using a known technique, such as a cyclic redundancy check (CRC). During the execution of Copy B, a new, correct Copy A can be restored in the firmware. This approach requires flash memory to be at least twice as large in order to provide both updateability and integrity.

The memory space required to maintain two separate copies may be unacceptable in many cases and, as it turns out, unnecessary. Therefore, it would be advantageous to have a method and an apparatus for a flash memory recovery that provides both integrity and updateability with minimal redundancy.

SUMMARY OF THE INVENTION

A method and an apparatus is presented for updating flash memory that contains a write protected code, a first copy of rewritable recovery code, a second copy of rewritable recovery code, and a rewritable composite code. Each block of rewritable code contains a checksum code to detect if the block of code has been corrupted.

If it is detected that the first copy of the recovery code is corrupted then the second copy of the recovery code is copied into the first copy of the recovery code. If it is detected the second copy of the recovery code is corrupted then the first copy of the recovery code is copied into the second copy of the recovery code. The recovery code is responsible for checking and updating the composite code. If it is detected the composite code is corrupted then a fresh copy of the composite code is obtained from a removable storage device or a network connection.

The data processing system is booted by executing the write protected code, the first copy of the recovery code, and the composite code. There is a minimum of redundant code by only replicating two copies of the recovery code while, at the same time, guaranteeing both the integrity and the updateability of the flash memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram showing the structure of flash memory according to a preferred embodiment of the present invention;

FIG. 5 is a flowchart depicting the flash memory update process according to a preferred embodiment of the present invention.

DETAILED DESCRIPTION OF THE PREFERRED EMBODIMENT

Figure 1:
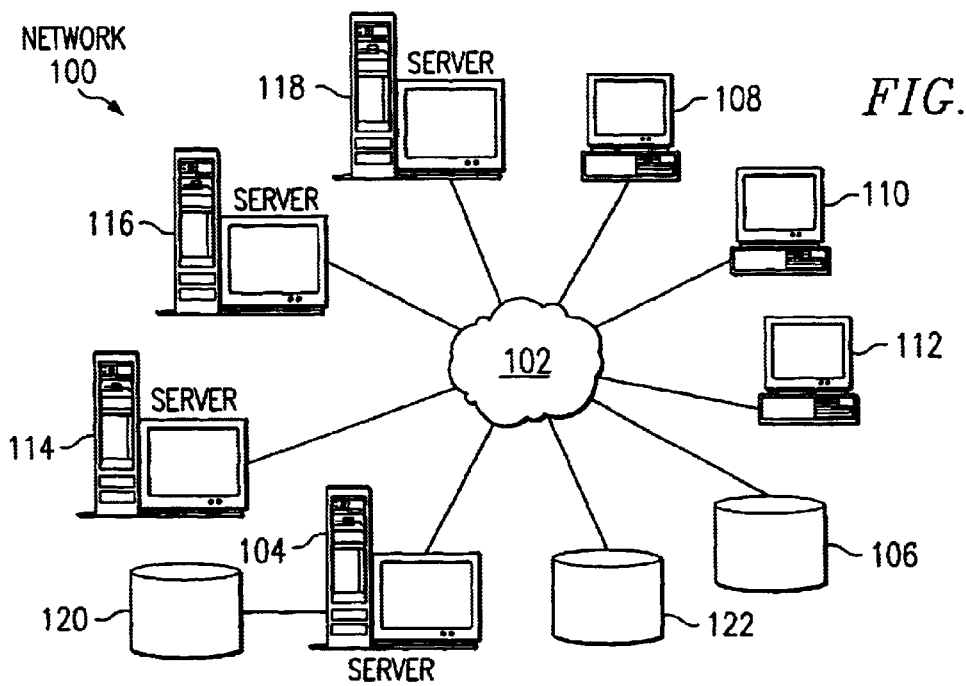
FIG. 1 is a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, servers 104, 114, 116 and 118 are connected to network 102. Storage units 106 and 122 are also connected to network 102, providing backup support for any or all of servers 104, 114, 116 and 118. Storage unit 122 provides dedicated backup support for server 104. In addition, clients 108, 110 and 112 are also connected to network 102. These three clients may be, for example, personal computers or network computers. For purposes of this application, a network computer is any computer coupled to a network, which receives a program or other application from another computer coupled to the network. Distributed data processing system 100 may include additional servers, clients, and other devices not shown.

In the depicted example, servers 104, 114, 116 and 118 provide storage for data from clients 108, 110 and 112. These four servers also provide data, such as boot files, operating system images, and applications to clients 108, 110 and 112. Clients 108, 110 and 112 are clients to one or all of servers 104, 114, 116 and 118. Support for a particular application being performed on one of clients 108, 110 and 112 may be by one of servers 104, 114, 116 and 118. Additionally servers 104, 114, 116 and 118 may provide backup support for each other. In the event of a server failure, a redundant backup server may be allocated by the network administrator, in which case requests directed to the failed server are routed to the redundant backup server.

In a similar manner, data backup support is provided by storage units 106 and 122 for servers 104, 114, 116 and 118. However, rather than the network administrator allocating a data backup storage unit at each use, data backup allocation is set, and data backup transfer occurs at low usage times, typically after midnight, between any of servers 104, 114, 116 and 118 and storage units 106 and 122.

In the depicted example, distributed data processing system 100 may be the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks, such as, for example, an intranet or a local area network.

FIG. 1 is intended as an example and not as an architectural limitation for the processes of the present invention. The present invention will typically be implemented as part of a server system, such as servers 104, 114, 116, and 118, because a server will contain a Service Process (SP), as described below. However, the invention could also be implemented in a client machine if it contained a Service Processor.

Figure 2:
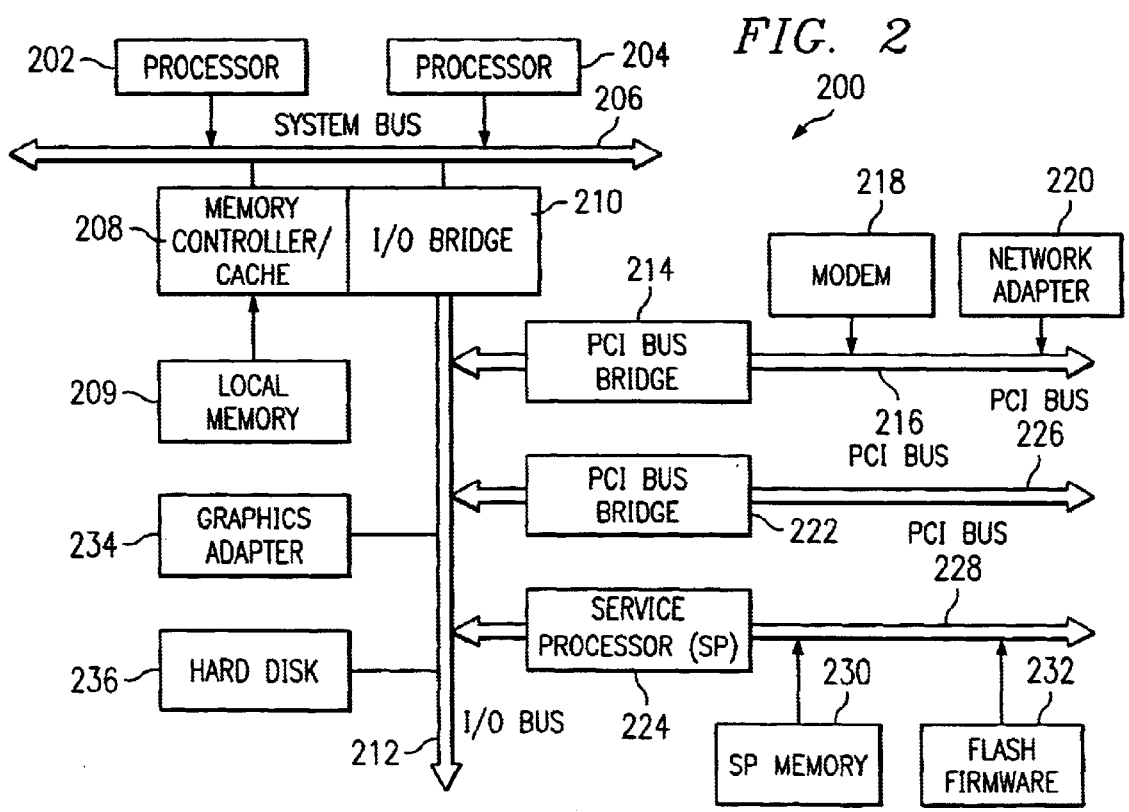
FIG. 2 is a block diagram of a data processing system that may be implemented as a server in which the present invention may be implemented.

Referring to FIG. 2, a block diagram of a data processing system which may be implemented as a server or client, such as server 104 or client 108 in FIG. 1. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

An additional PCI bus bridge 222 provides an interface PCI bus 226, from which additional modems or network adapters may be supported. In this manner, server 200 allows connections to multiple network computers. A memory mapped graphics adapter 234 and hard disk 236 may also be connected to I/O bus 212 as depicted, either directly or indirectly.

A typical server system contains a "service processor" (SP) 224, which is "a computer in a computer." The main task of the SP is to initialize the system at power-up. When the system is running, the SP monitors system resources for recoverable errors to assist in predictive failure analysis. In case of a catastrophic system failure, the SP remains "alive" and can report the problem and even attempt reboot or recovery in a degraded mode of operation until the failing part is replaced. These are just some examples of the SP's functions. In this invention SP 224 uses SP bus 228 and SP memory 230 to update flash firmware 232. The structure of flash firmware 232 is described in FIG. 3, the boot algorithm is described in FIG. 4, and the flash update algorithm is described in FIG. 5.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000, a product of International Business Machines Corporation in Armonk, New York, running the Advanced Interactive Executive (AIX) operating system.

Boot code in a computer system, such as the boot code shown as flash firmware 232 in FIG. 2, should always provide a mechanism for starting the computer and loading the operating system. If boot code is stored in read-only memory (ROM) then it will never be corrupted. However, this does not allow for updating the system hardware or the system software easily. Therefore flash memory is used to store boot code so that it can be updated to accommodate changes in the computer system. However, this leads to the problem that a portion of the boot code may be corrupted during an update and the system cannot be booted from flash memory. Thus, there is a need for a mechanism to recover from the corruption of the boot code without replacement of the hardware components with the corrupted code.

One approach to solve the problem of integrity and updateability is to keep two complete copies of the boot code, call these Copy A and Copy B, in flash memory. This will at a minimum double the size of the memory but will provide both integrity and flexibility. The system will boot using Copy A of the boot code, but, if for some reason that copy is corrupted, then the system will boot off Copy B, which is assumed not to be corrupted. Once the boot is complete the contents of Copy B can be copied back to Copy A so that both copies are intact.

If the contents of the boot code need to be updated, then the new code can be copied to Copy A. If the update is successful, then the new code can be copied to Copy B after successfully booting from Copy A. If the update is unsuccessful, then the old copy of the boot code is still intact in Copy B and, after booting up using Copy B, its contents can be copied to Copy A. The system is now back to its original state and the update of the boot code can be attempted again.

The above description is what commonly is done in the prior art. The major drawback to this approach is that the size of the flash memory doubles. The present invention focuses on providing the same level of integrity and updateability as a full duplication of boot code but accomplishes this at a much lower cost than doubling the size of the flash memory.

With reference now to FIG. 3, a block diagram shows the structure of the firmware flash memory in accordance with the present invention. There are two types of memory access in Firmware Flash Memory 300. Write protected code that cannot be updated, but it also cannot be corrupted. Read/write code can be updated, but there is the potential for corruption, so a recovery mechanism must be provided.

Write protected code 302 reboots the computer system even if there has been some damage to the read/write code in the remainder of the flash memory. There are two copies of the recovery code itself: Copy A 304 and Copy B 306. In addition to the recovery code, all other firmware code required to configure or boot the system is stored as composite code 308. The primary functions of the recovery code are to insure the integrity of the composite code and, if corruption is detected in the composite code, install a fresh copy of the composite code from a designated data source. The only code replication in this scheme is the two copies of the recovery code, 304 and 306, which should be a small fraction of the replication required for full duplication of the flash memory code. To understand how this invention works, it is necessary to discuss the operations of booting the system initially and updating the boot code.

Figure 4:
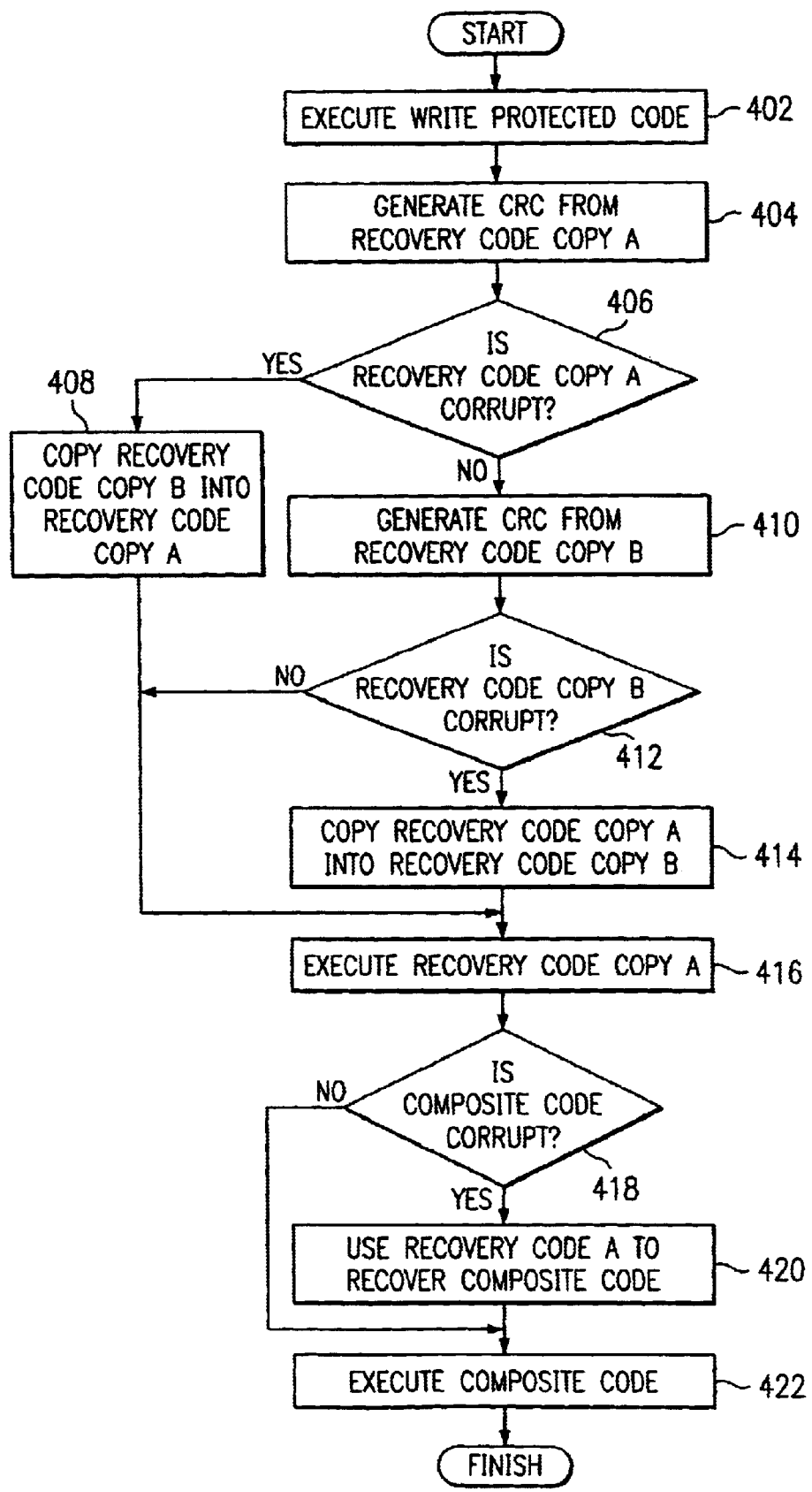
FIG. 4 is a flowchart depicting the boot process according to a preferred embodiment of the present invention.

FIG. 4 presents a flowchart of the operation of booting the computer and, if an error occurs in the read/write code for either the recovery code or the composite code, installing fresh copies of the corrupted code. For the sake of discussion, we will assume some mechanism, such as a cyclic redundancy check (CRC), is used to detect whether a block of code has been corrupted or not. CRC is a technique where a "checksum" is appended to the end of a block of data that is being checked for possible corruption. A new checksum is calculated based on the data received and compared with the checksum appended to the data. If the two values agree, it is highly likely that the data has not been corrupted. The width of the checksum value affects the accuracy of the detection of corruption. Two commonly used standards are CRC16, a 16 bit wide checksum, and CRC32, a 32 bit wide checksum as used with the Ethernet protocol.

The values associated with CRC can be varied; some are better to detect single bit errors, others detect two bit errors; and still others are best for burst errors. CRC is not an infallible technique, but the probability of not detecting corruption when it has occurred is approximately $(0.5)^W$, where W is the bit width of the checksum. As one of ordinary skill in the art will appreciate, there are other integrity tests for the corruption of a block of code and often multiple tests are used in conjunction with each other. For the sake of discussing this invention, we will assume some mechanism is employed to detect whether a block of code is corrupted or not and the technique has a high probability of correctly detecting corruption.

As shown in FIG. 4, the first step in the process (step 402) is to execute the write protected code, as shown as code block 302 in FIG. 3. Copy A of the recovery code is scanned to generate a CRC checksum (step 404) which is compared with the stored CRC checksum. If the recovery Copy A is detected to be corrupted (step 406: yes), then the duplicate copy of the recovery code in Copy B, code 306 in FIG. 3, is copied into Copy A (step 408). If Copy A is not corrupted (step 406: no), then the CRC character for Copy B is generated (step 410). If Copy B has been corrupted (step 412: yes), then the recovery code in Copy A is copied into Copy B (step 414). If Copy B has not been corrupted (step 412: no), then both copies of the recovery code are intact.

At the start of execution of the recovery code in Copy A (step 416), it is known that both the recovery code in Copy A and Copy B are correct. As part of the recovery code process, a CRC is made for the composite code. If the composite code is corrupted (step 418: yes), then the recovery code will know where to fetch a fresh copy of the composite code and restore it (step 420). The source of the "fresh" copy depends on the implementation. In a preferred embodiment a diskette is used. However, other media, such as a CD-ROM, or other sources of data, such as a network connection, may be used. If the composite code has not been corrupted (step 418: no), then no recovery action is needed. The boot process ends with the execution of the composite code (step 422) which is known to be uncorrupted.

The boot mechanism described above will work correctly and leave the flash memory intact if there is an error in one copy of the recovery code or an error in the composite code or errors in both. In some respects this is similar to the prior art where redundant copies of the entire read/write code is maintained, but it differs from the prior art in the following important ways. The amount of redundant code is greatly reduced since the recovery code is typically much smaller than the composite code where the bulk of the work is performed. Since the recovery code contains information on how to restore the composite code if it is corrupted, it is now only necessary to maintain one copy of the composite code.

FIG. 4 describes the recovery process if the read/write portion of flash memory has been corrupted. The next operation, shown in FIG. 5, is the update of the flash memory in a secure manner. This update might involve changing the recovery code or changing both the recovery code and the composite code. This update operation must be recoverable, in the sense that if either update is not successful, then the system will still be in the pre-update state and the update can be attempted again. Since the recovery code contains the mechanism for updating the composite code, it is particularly critical that it is not possible to corrupt both copies of the recovery code.

The operation begins by copying the new recovery code into Copy B (306 in FIG. 3) of the flash code (step 502). If this copy fails (step 504: no), then the update has failed and this will have to be indicated in an error code (step 514) so the update can be attempted again. At this point the recovery code Copy B is corrupt and the recovery code Copy A is intact, but is the old copy of the recovery code. By executing the flash boot code given in FIG. 4 (step 512), the corrupted Copy B of the recovery code will be replaced by the intact Copy A.

If the update of Copy B is successful (step 504: yes), then the Copy A is purposely "corrupted" by changing the CRC code associated with Copy A (step 506). If the composite code needs updating (step 508: yes), then it is updated. Since the boot flash code will be executed next (step 512), any failure in updating the composite code will be detected during this step and the old copy restored. If there is no update of the composite code (step 508: no), then the operation proceeds immediately to the boot process (step 512). At the time step 512 is executed, either Copy A will be corrupted (due to step 506) or Copy B will be corrupted due to the failure of the update, but both copies will not be corrupted. When the boot code is executed (step 512) the corrupted copy will be replaced with the correct copy.

If there is an update of the composite code (step 508: yes), then the composite code is updated from a specified source (step 510). The flash boot code is then executed (step 512). The integrity of the composite code is checked as part of executing the flash boot code (step 418), thus providing a fail-safe mechanism in the event the update process in step 510 is corrupted.

Thus, the present invention provides updateability of boot code, which means a portion of the boot code must be writeable, yet provides integrity in the event an error occurs during the update process. In the past this was accomplished by making a complete duplicate copy of the boot code. Using the method and apparatus outlined in this invention, the goals of integrity and updateability can be achieved by only duplicating a small portion of the boot code.

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed:

1. A method in a data processing system of updating a flash memory having a write protected code, a first recovery code, a second recovery code, and a composite code, the method comprising the steps of:
   said second recovery code being a duplicate copy of said first recovery code;
   performing an update operation on the second recovery code to generate updated second recovery code;
   determining if the updated second recovery code is corrupted;
   purposefully corrupting, by the update operation, the first recovery code if the updated second recovery code is not corrupted in order to invalidate the first recovery code;
   updating the composite code if the updated second recovery code is not corrupted and if the composite code is to be updated;
   said flash including only one copy of said write protected code and said composite code, wherein said write protected code and said composite code are not duplicated within said flash memory; and
   rebooting the data processing system, said flash memory being updated without said flash memory maintaining two copies of said write protected code or said composite code.

2. The method of claim 1, wherein if the updated copy of the second recovery code is corrupted, then an error message is generated and the data processing system is rebooted without attempting to update the composite code.

3. The method of claim 2, wherein rebooting the data processing system further comprises the steps of:
   executing the write protected code;
   executing the first copy of the recovery code;
   determining if the composite code is corrupted and, if the composite code is corrupted, updating the composite code from a data transmission media; and
   executing the composite code.

4. The method of claim 3, wherein the data transmission media is a storage media.

5. The method of claim 3, wherein the data transmission media is a network.

6. The method of claim 3, wherein executing the write protected code further comprises the steps of:
   determining if the first copy of the recovery code is corrupted;
   determining if the second copy of the recovery code is corrupted if the first copy of the recovery code is not corrupted;
   copying the first copy of the recovery code into the second copy of the recovery code if the first copy of the recovery code is not corrupted and the second copy of the recovery code is corrupted.

7. The method of claim 6, wherein if it is determined the first copy of the recovery code is corrupted, then the second copy of the recovery code is copied into the first copy of the recovery code.

8. The method of claim 7, wherein a checksum code appended at an end of a read/write flash memory block is used to detect if the read/write flash memory block has been corrupted.

9. An apparatus in a data processing system for flash memory, the apparatus comprising:
   a write protected code in the flash memory;
   a first copy of a recovery code in a read/write block of the flash memory;
   a second copy of a recovery code in a read/write block of the flash memory, said second copy of said recovery code being a duplicate copy of said first copy of said recovery code;
   a composite code in a read/write block of the flash memory;
   said flash including only one copy of said write protected code and said composite code, wherein said write protected code and said composite code are not duplicated within said flash memory; and
   said flash memory being updated without said flash memory maintaining two copies of said write protected code or said composite code.

10. The apparatus of claim 9, wherein a checksum code appended at an end of a read/write block in flash memory is used to detect if the read/write block has been corrupted.

11. The apparatus of claim 10, wherein if it is detected the first copy of the recovery code is corrupted then the second copy of the recovery code is copied into the first copy of the recovery code.

12. The apparatus of claim 11, wherein if it is detected the second copy of the recovery code is corrupted then the first copy of the recovery code is copied into the second copy of the recovery code.

13. The apparatus of claim 12, wherein if it is detected the composite code is corrupted then the composite code is undated by writing an updated composite code in the flash memory from a data transmission media.

14. The apparatus of claim 13, wherein the data transmission media is a storage media.

15. The apparatus of claim 13, wherein the data transmission media is a network.

16. The apparatus of claim 12, wherein the data processing system is booted by executing the write protected code, the first copy of the recovery code, and the composite code.

17. A computer program product stored in a flash memory for use in booting a data processing system, the computer program product comprising:
   instructions stored in write protected memory for initializing a booting process;
   a first copy of instructions stored in read/write memory for system recovery;
   a second copy of instructions stored in read/write memory for system recovery, said second copy of said recovery code being a duplicate copy of said recover code;
   composite instructions stored in read/write memory for completing the booting process;
   said flash including only one copy of said write protected code and said composite code, wherein said write protected code and said composite code are not duplicated within said flash memory; and
   said flash memory being updated without said flash memory maintaining two copies of said write protected code or said composite code.

18. The computer program product of claim 17, wherein instructions stored in write protected memory determine if the first copy of the system recovery instructions is corrupted.

19. The computer program product of claim 18, wherein instructions stored in write protected memory will copy the second copy of the system recovery instructions into the first copy of the system recovery instructions if it is detected the first copy of the system recovery instructions is corrupted.

20. The computer program product of claim 19, wherein instructions stored in write protected memory determine if the second copy of the system recovery instructions is corrupted.

21. The computer program product of claim 20, wherein instructions stored in write protected memory will copy the first copy of the system recovery instructions into the second copy of the system recovery instructions if it is detected the second copy of the system recovery instructions is corrupted.

22. The computer program product of claim 21, wherein instructions stored in the first copy of the recovery instructions determine if the composite instructions are corrupted.

23. The computer program product of claim 22, wherein instructions stored the first copy of the recovery instructions will make a fresh copy of the composite instructions if it is detected the composite instructions are corrupted.

24. The computer program product of claim 23, wherein the fresh copy of the composite code is copied from a data transmission media.

25. The computer program product of claim 24, wherein the data transmission media is a storage media.

26. The computer program product of claim 24, wherein the data transmission media is a network.

27. The computer program product of claim 23, wherein instructions generate a first checksum value for a read/write block in the flash memory and compare it with a second checksum value appended at the end of the read/write block to determine if the read/write block is corrupted.

* * * * *

UNITED STATES PATENT AND TRADEMARK OFFICE
CERTIFICATE OF CORRECTION

PATENT NO. : 6,665,813 B1
DATED : December 16, 2003
INVENTOR(S) : Forsman et al.

It is certified that error appears in the above-identified patent and that said Letters Patent is hereby corrected as shown below:

<u>Column 2,</u>
Line 49, delete "122" and insert -- 120 --.

<u>Column 3,</u>
Line 27, after "Service", delete "Process" and insert -- Processor --.

<u>Column 8,</u>
Line 54, after "said", delete "recover" and insert -- recovery --.

Signed and Sealed this

Fifteenth Day of June, 2004

JON W. DUDAS
*Acting Director of the United States Patent and Trademark Office*